(12) United States Patent
Hutchin

(10) Patent No.: US 9,297,880 B2
(45) Date of Patent: Mar. 29, 2016

(54) TWO AXIS INTERFEROMETER TRACKING DEVICE AND METHOD

(71) Applicant: Optical Physics Company, Calabasas, CA (US)

(72) Inventor: Richard A. Hutchin, Reno, NV (US)

(73) Assignee: OPTICAL PHYSICS COMPANY

( * ) Notice: Subject to any disclaimer, the term of this patent is extended or adjusted under 35 U.S.C. 154(b) by 120 days.

(21) Appl. No.: 14/150,372

(22) Filed: Jan. 8, 2014

(65) Prior Publication Data

US 2015/0192411 A1 Jul. 9, 2015

(51) Int. Cl.
*G01B 9/02* (2006.01)
*G01S 3/786* (2006.01)
*G01S 3/781* (2006.01)

(52) U.S. Cl.
CPC ............... *G01S 3/7867* (2013.01); *G01S 3/781* (2013.01)

(58) Field of Classification Search
CPC .. G01B 11/14; G01B 2290/10; G01B 11/002; G01S 3/7867
See application file for complete search history.

(56) References Cited

U.S. PATENT DOCUMENTS

| | | | |
|---|---|---|---|
| 4,626,100 A * | 12/1986 | Johnson | 356/141.3 |
| 8,045,178 B2 | 10/2011 | Hutchin | |
| 8,358,400 B2 | 1/2013 | Escuti | |
| 2005/0278126 A1 | 12/2005 | Rosakis et al. | |
| 2010/0002242 A1 * | 1/2010 | Hutchin | 356/520 |
| 2012/0188467 A1 * | 7/2012 | Escuti et al. | 349/1 |

OTHER PUBLICATIONS

Partial European Search Report for EP 14168693 dated Jun. 8, 2015.

\* cited by examiner

*Primary Examiner* — Kara E Geisel
*Assistant Examiner* — Shawn Decenzo
(74) *Attorney, Agent, or Firm* — The Belles Group, P.C.

(57) ABSTRACT

An interferometric tracking device includes image dividers arranged to form an optical cascade, with one of the image dividers being an incident image divider for the optical cascade and one or more of the image dividers being one or more exit image dividers for the optical cascade. Each of the image dividers splits incident light into a plurality of non-parallel orthogonally polarized beams, the beams from the incident image divider cascading through the other image dividers in the cascade. One of a plurality of shearing interferometers is optically coupled between optically adjacent image dividers in the cascade. The orthogonally polarized beams from the one or more exit image dividers are imaged onto one or more focal plane arrays.

29 Claims, 11 Drawing Sheets

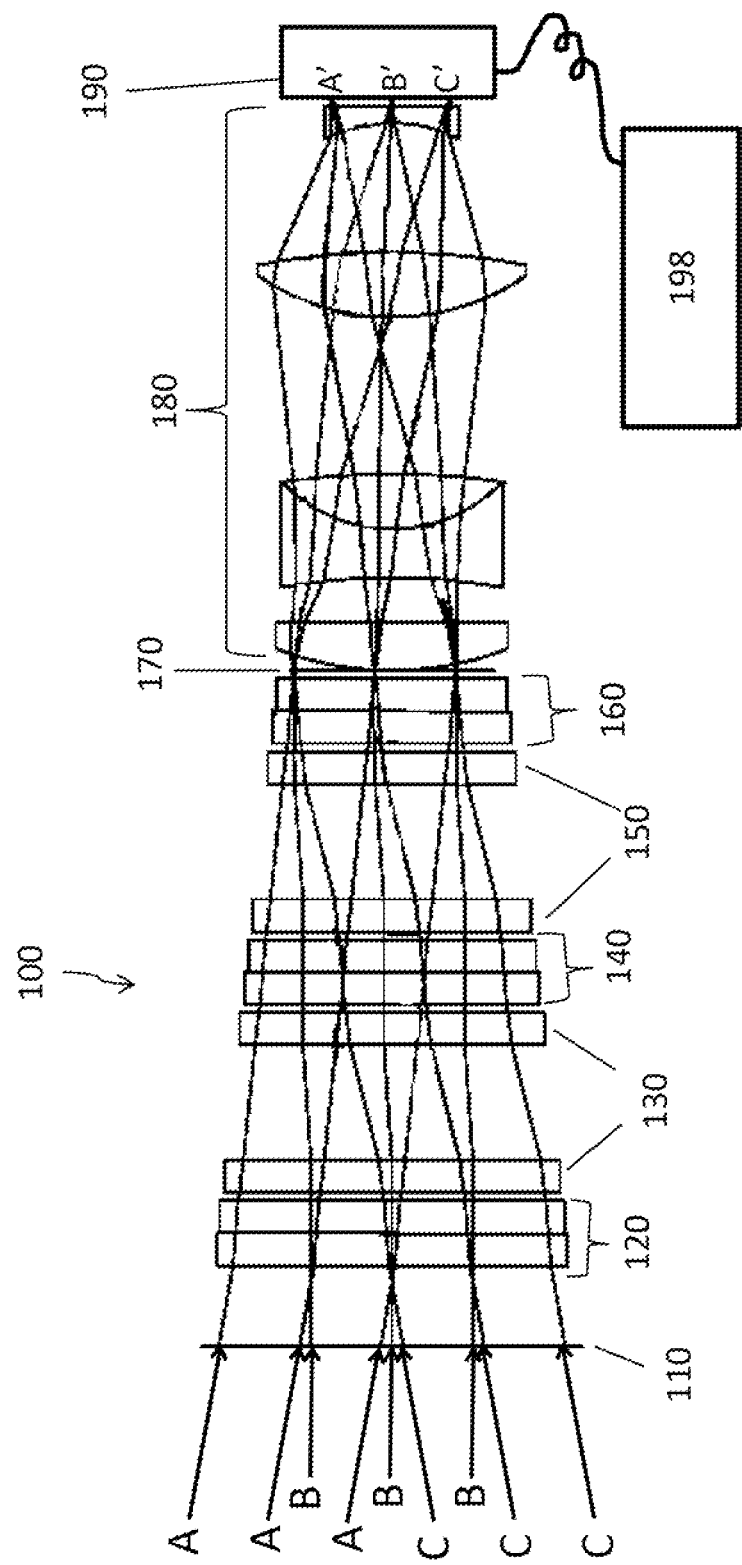

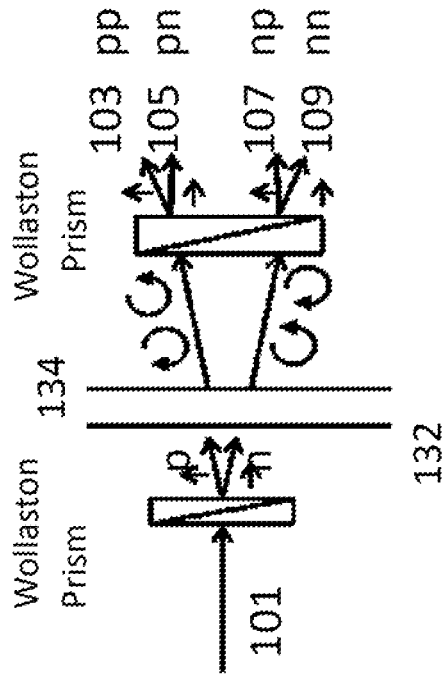
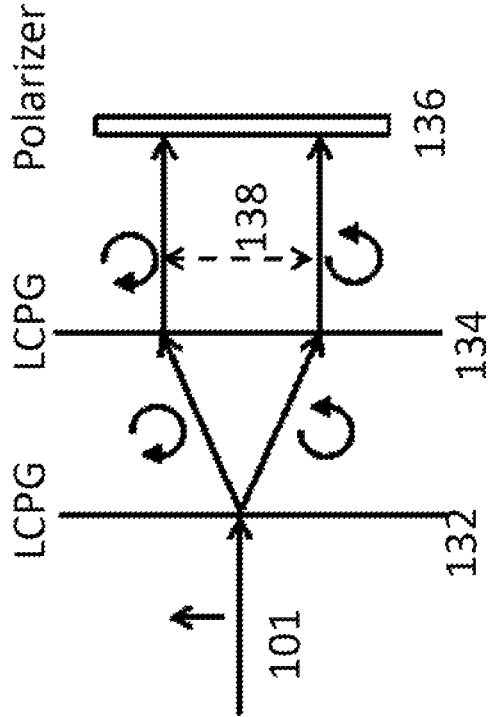

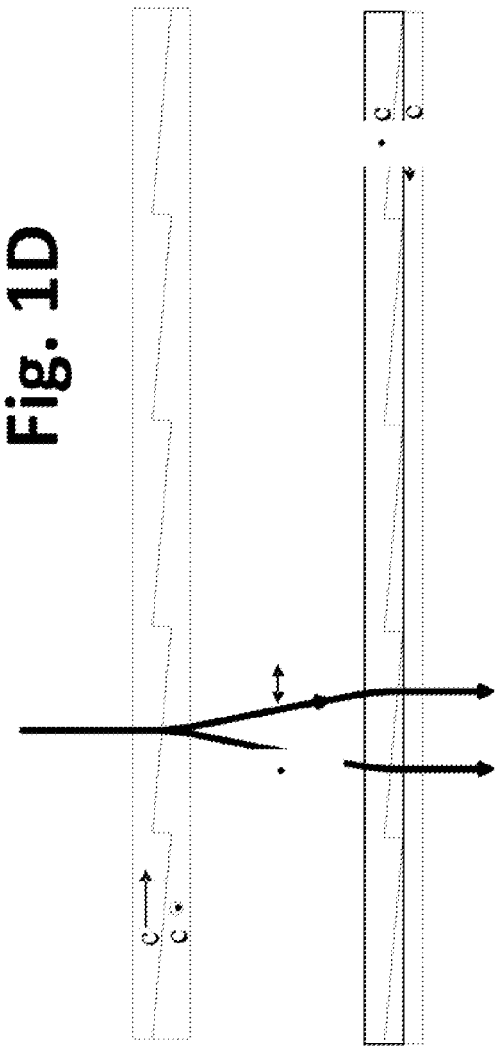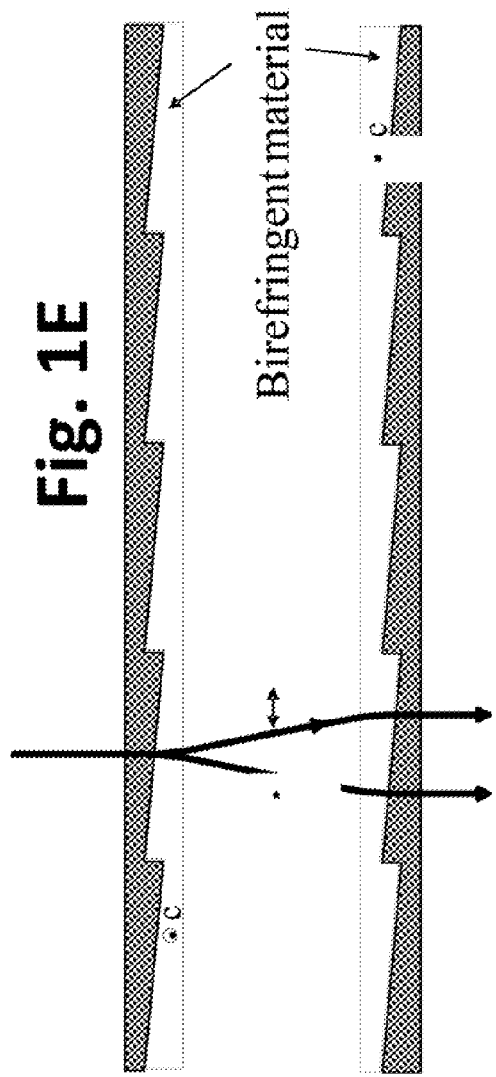

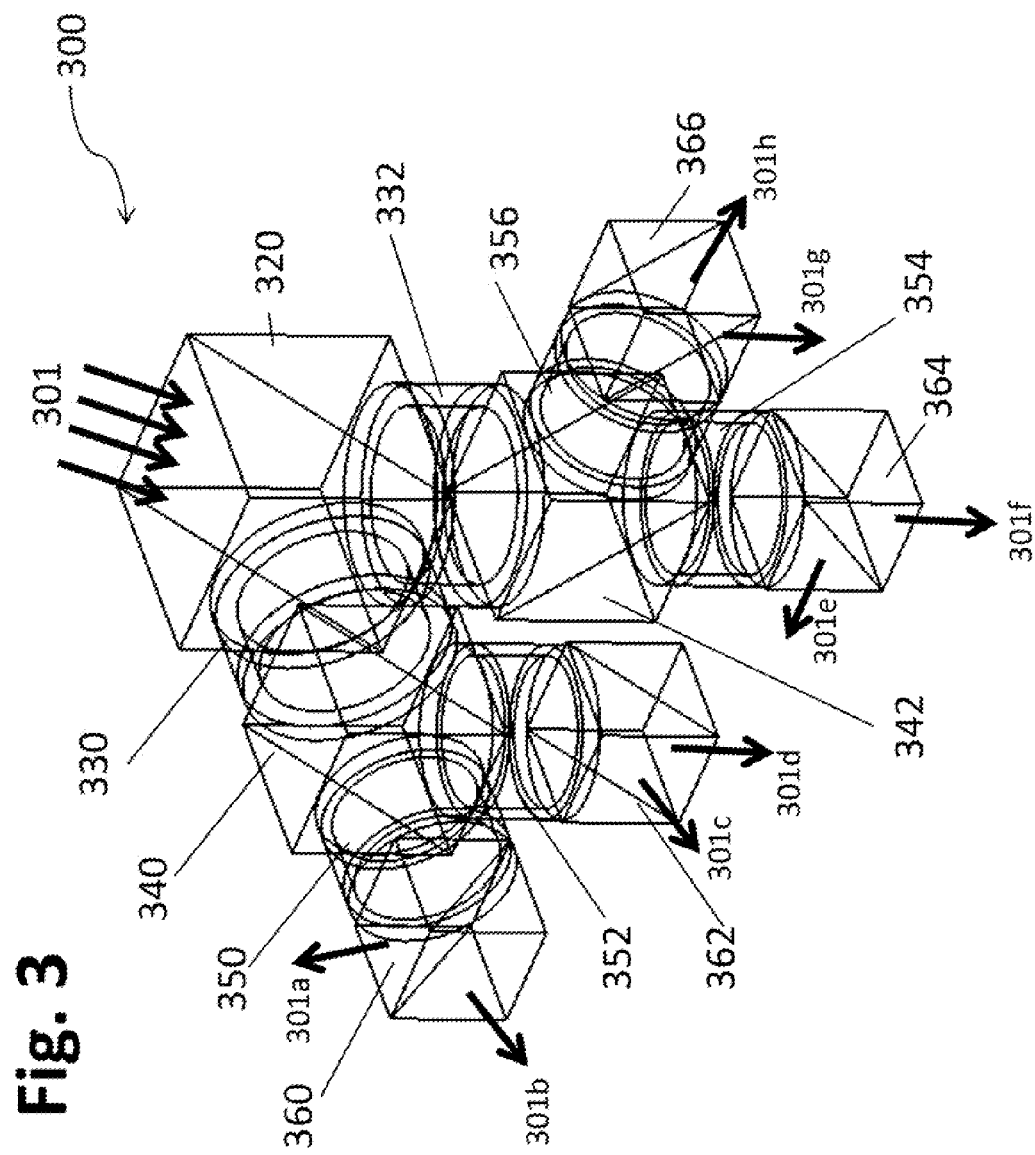

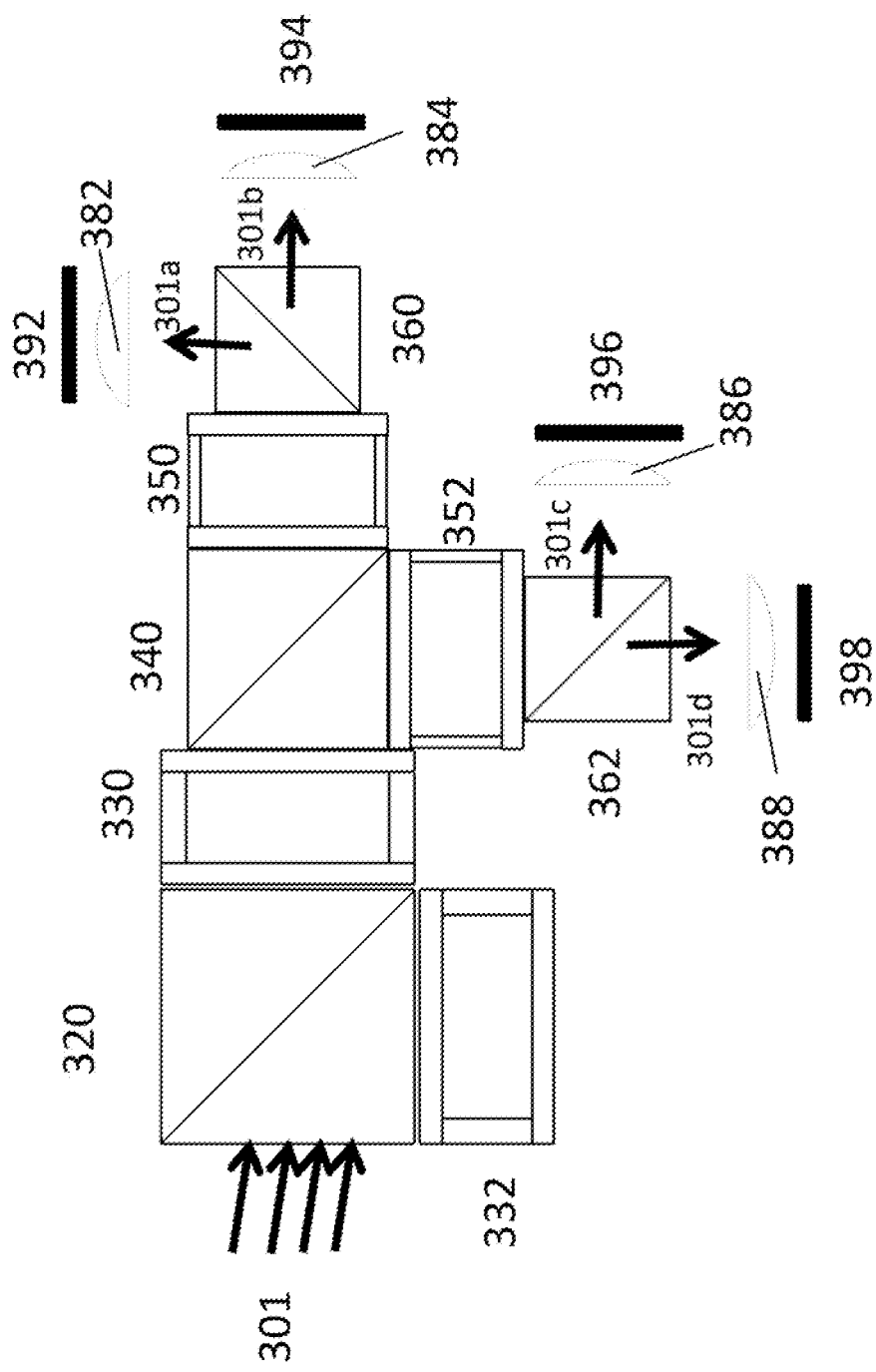

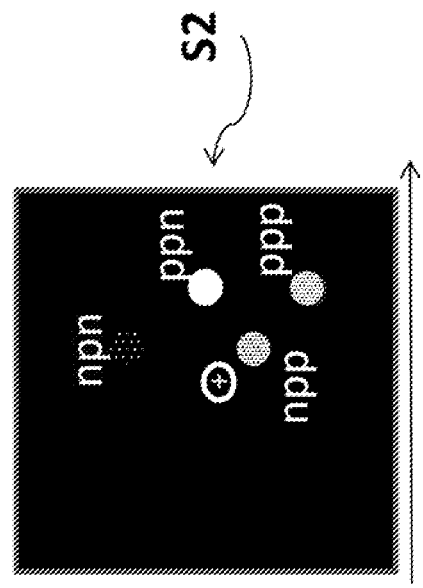
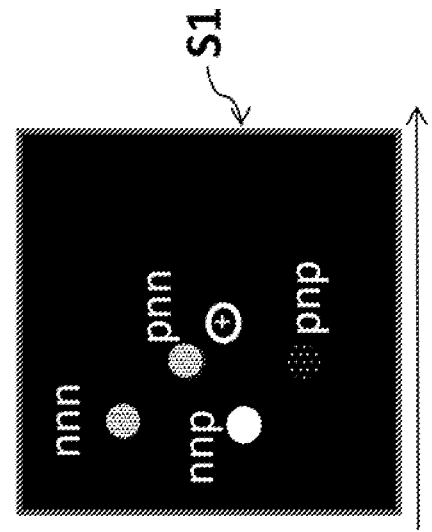
Fig. 5B

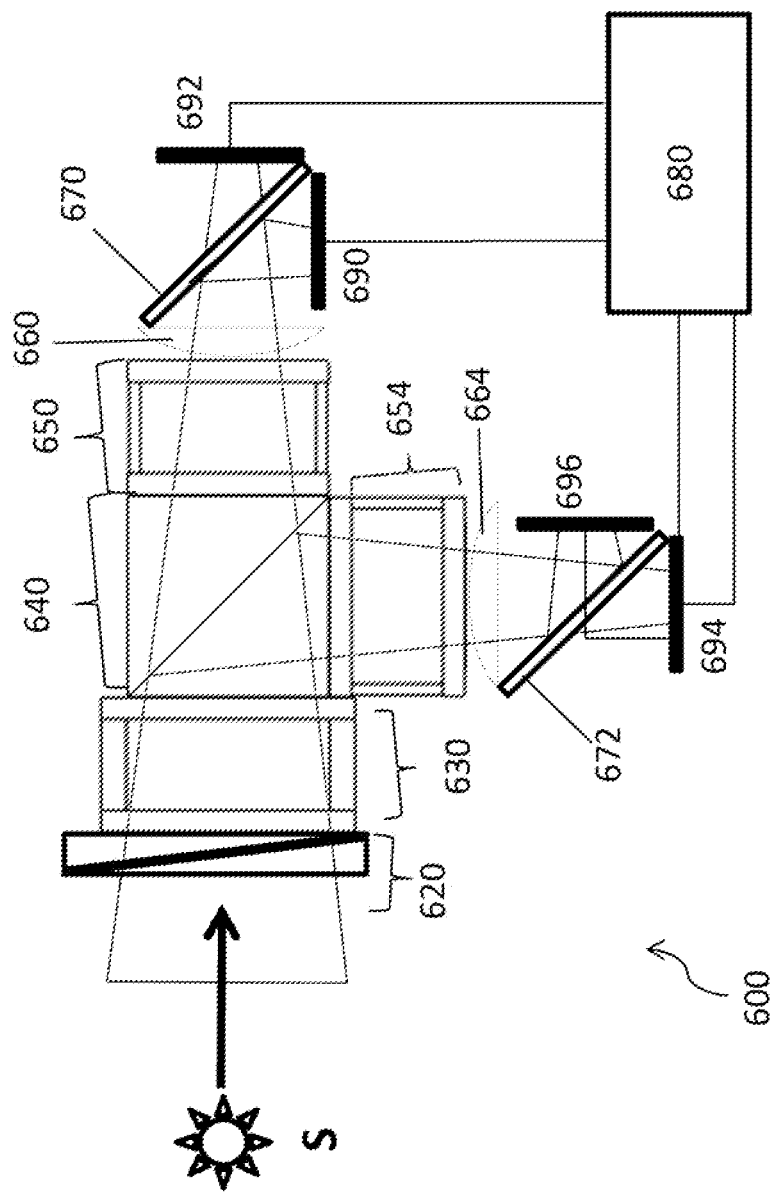

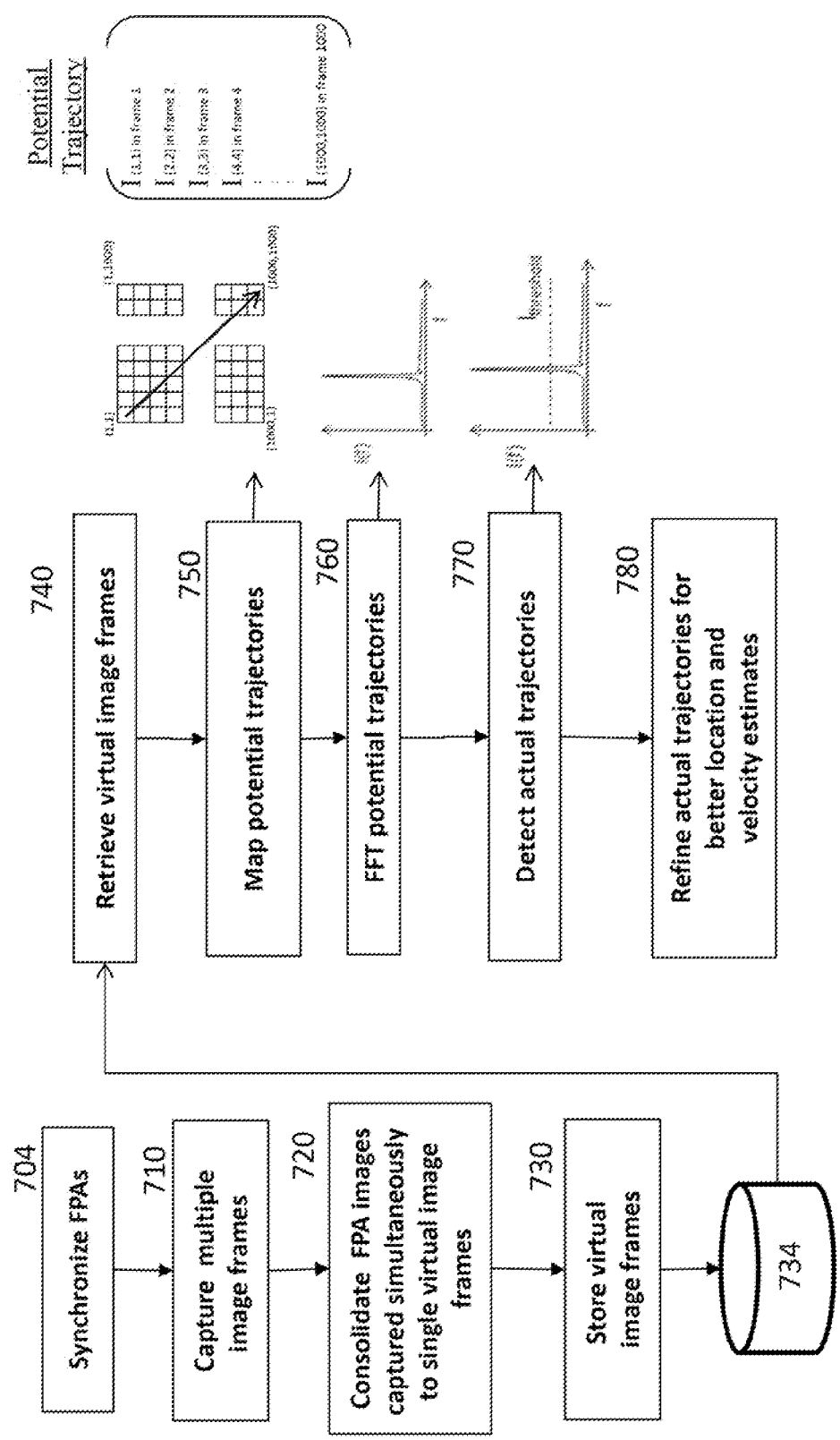

TWO AXIS INTERFEROMETER TRACKING DEVICE AND METHOD

BACKGROUND OF THE INVENTION

1. Field of the Invention

The field of the present invention is optical tracking devices, particularly optical tracking devices that are used to determine the position and trajectory of a light source by measuring the axial direction of beams of light from that light source.

2. Background

Optical tracking is a general purpose tool that can be used as an enabling technology in a broad range of applications. One example is determining the axial direction of a laser beam. For example, a suitably accurate optical tracker could be incorporated into a surface scanning device which, by sending out a laser beam towards a surface with unknown orientation and measuring the reflected beam's axial direction, determines the surface orientation with respect to the scanning device. Measuring multiple surface orientations in this manner also provides information about the relative orientation of these multiple surfaces or surface segments, and thus generates a contour map.

Optical tracking devices can also be used aboard stationary or moving platforms to determine their position or orientation with respect to one or more light sources. One example application is a ground based observation station which is tasked with tracking spacecraft in Earth orbit. An optical tracking device is required to measure and track the axial direction of light coming from one or more such spacecraft. This light can be reflected sunlight, reflected laser light, or light originating from the spacecraft itself. A second example is an airborne reconnaissance platform tasked with tracking moving ground vehicles. The light reflected from or originating from the ground vehicle can be registered by an optical tracker mounted on the airborne platform. The multiple image frames can further be processed to determine the trajectory of the ground vehicle. A third example is an optical stellar tracking device, commonly known in the art as a star sensor or a star tracker. A star tracker determines the orientation of the spacecraft it is mounted on with respect to a known star field or star constellation. The accuracy with which the tasks outlined in these three examples are performed depends, at least in part, upon the accuracy of the optical tracking device used.

An improved optical tracking device and method of tracking the position of a light source have been disclosed in U.S. Pat. No. 8,045,178. The device disclosed is essentially a single axis tracking device because it uses one pair of gratings to shear the incoming light in one direction and is capable of improving tracking accuracy along that direction only. Along the axis that is perpendicular to the shearing direction, this single axis tracking device will have accuracy no greater than that of the coarse position estimate provided by the location of the image of the light source on the image plane. To increase tracking accuracy along two axes, the apparatus disclosed in U.S. Pat. No. 8,045,178 prescribes that two interferometric tracking devices be coupled together. The coupled arrangement could involve using two or more of the single axis interferometric tracking devices with their shearing axes oriented to coincide with the axes along which higher accuracy is desired. This would at least double the size and weight of the overall device. Using a single two axis tracking device would be more practical or desirable than using two single axis tracking devices for many applications.

SUMMARY OF THE INVENTION

The present invention is directed towards an interferometric tracking device and method of determining the relative position of a light source. The device and method are readily usable for two-axis tracking, the two axes being perpendicular to each other and enabling determination of a relative angular position of a light source imaged on an image plane.

In a first separate aspect of the present invention, the interferometric tracking device includes image dividers arranged to form an optical cascade, with one of the image dividers being an incident image divider for the optical cascade and one or more of the image dividers being one or more exit image dividers for the optical cascade. Each of the image dividers splits incident light into a plurality of non-parallel orthogonally polarized beams, the beams from the incident image divider cascading through the other image dividers in the optical cascade. One of a plurality of shearing interferometers is optically coupled between optically adjacent image dividers in the optical cascade. The orthogonally polarized beams from the one or more exit image dividers are imaged onto one or more focal plane arrays.

In a second separate aspect of the present invention, a method of determining a position of a source of light includes receiving light from the source into an aperture to generate an incident beam, then splitting the light in each of a plurality of successive splitting stages, each splitting stage generating two non-parallel beams as a beam pair from each of one or more input beams, wherein each beam of each beam pair has a linear polarization orthogonal to the linear polarization of the other beam of the beam pair. The beams of each beam pair are sheared along a first, direction between a first pair of the plurality of successive stages, and the beams of each beam pair are also sheared along a second direction between a second pair of the plurality of successive stages. The beams are imaged onto a plurality of spots on one or more focal plane arrays. A relative coarse position of the source is estimated based on a position of the plurality of spots on the one or more focal plane arrays, and a relative fine position of the source is estimated based on relative intensities of the plurality of spots on the one or more focal plane arrays.

In a third separate aspect of the invention, a method for calibrating an interferometric tracking device includes placing a point source at each of a plurality of positions in the field of view of the interferometric tracking device, wherein light from the point source received by the interferometric tracking device has a known axial direction at each of the positions. Positions and intensities of a plurality of spots imaged from the point source onto a focal plane array of the interferometric tracking device are measured and recorded for the point source placed at each of the plurality of positions. A relative phase and modulation level is calculated for each of the plurality of spots for each of the plurality of positions, and a look-up table is compiled containing a relationship between axial direction and the relative phase and modulation level for each of the plurality of spots for each of the plurality of positions.

In a fourth separate aspect of the invention, a method for determining a position of a source of light using an interferometric tracking device includes calibrating the interferometric tracking device to compile one or more look-up tables. Light from a source is received into an aperture of the interferometric tracking device, and estimates of a relative coarse position and a relative fine position of the source are made by comparing positions of spots and relative intensities of the spots imaged from the source onto one or more focal plane arrays with one or more look-up tables.

Accordingly, a two-axis interferometric tracking device and methods determining the relative position of a light source are disclosed. Advantages of the improvements will appear from the drawings and the description of the preferred embodiment.

BRIEF DESCRIPTION OF THE DRAWINGS

In the drawings, wherein like reference numerals refer to similar components:

FIG. 1A is a schematic illustration of a two axis interferometric tracking device with two pairs of gratings, three Wollaston prisms, and one focal plane array (FPA);

FIG. 1B is a schematic illustration of polarization changes as a light beam travels through a pair of liquid crystal polarization gratings (LCPG);

FIG. 1C is a schematic illustration of polarization changes and beam divergences as a light beam travels through a pair of LCPG disposed between two Wollaston prisms;

FIG. 1D illustrates a pair of blazed gratings made of birefringent material;

FIG. 1E illustrates a pair of birefringent gratings constructed by filling the grooves of a blazed grating with birefringent material;

FIG. 3 partially illustrates an alternate embodiment of the two axis interferometric tracking device with eight focal plane arrays;

FIG. 4 illustrates part of the alternate embodiment of the two axis interferometric tracking device shown in FIG. 3;

FIG. 5B illustrates the arrangement of eight spots corresponding to a single distant light source on the two FPAs of FIG. 5A;

FIG. 6A is a schematic illustration of a two axis interferometric tracking device with four focal plane arrays;

FIG. 7 illustrates the processing of image frames to detect and track dim objects accurately using the two, four, or eight FPA tracking devices shown in FIG. 5A, FIG. 6A, and FIG. 3.

DETAILED DESCRIPTION OF THE PREFERRED EMBODIMENTS

Figure 2:
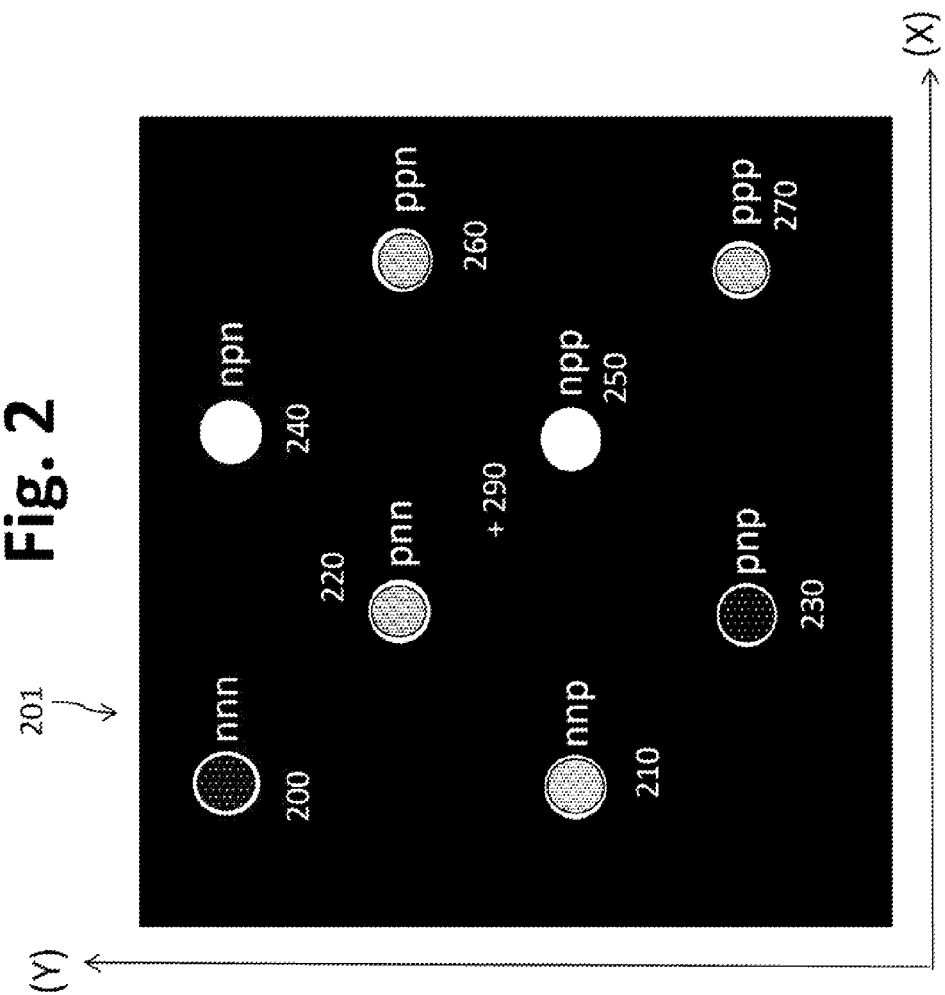
FIG. 2 is an image of a single light source as it would be imaged onto the focal plane array (FPA) of the two axis interferometric tracking device shown in FIG. 1A.

The term "point source" as used herein is defined as a source of light which can be considered as being effectively emitted from a single point. The following are examples of point sources, and are in no way intended to limit the definition:

1. Parallel beams of light confined to a sufficiently small diameter, such as that emitted from most common tabletop lasers;

2. Light emitted from a distant source, such as a star;

3. Light from a diffuse light source reflected off an object, such as sunlight reflected off an orbiting body, e.g., a satellite or other space-based platform, when seen or detected at a significant distance;

4. Light from a laser reflected off of an object or surface; and

5. Light emitted from a diffuse light source passed through a pin hole.

The two axis interferometric tracking device operation is based on the operating principles of a grating shearing interferometer.

The two axis interferometric tracking device includes two shearing interferometers each comprising a pair of gratings. Each grating pair, in turn, consists of two gratings in substantially angular alignment, separated by a spacer. Light incident on the first grating of a grating pair is diffracted by the first grating, which is constructed to provide strong +1 and −1 order diffractions, and little energies in the other orders. Each of these modes is further diffracted at the second grating of the grating pair. The resulting 0th order mode (1st order mode from first grating and the −1st order mode from the second grating, and vice versa) will produce an interference pattern which varies with the incidence angle of the light incident on the first grating. This arrangement encodes the position of the light source as sinusoidally modulated intensities on a focal plane array (FPA), the phase of which measures the track angle with near perfect linearity As the incidence angle changes, the sinusoidal interference pattern shifts back and forth, depending on the direction of angular motion, and very precise angle motion can be sensed by the changes in the fringe phase. Furthermore, the phase of the interference pattern is nearly independent of the wavelength and is highly linear with respect to the incidence angle; with only a slight deviation due to the difference between the sine function and linear ramp which can be calibrated. The phase difference between the two interference signals is periodic with incident angle with a period (hereafter called angular period) equal very nearly to $p_g/2d$ where $p_g$ is the period of the grating and d is the separation of the two gratings. By using small period gratings (i.e., small $p_g$) and adjusting the separation distance (d), the angular period can be very small, and with phase sensitive detection providing $1/100$-$1/1000$ angular period detection, the grating interferometer can offer angular sensitivity of <500 nanoradian level on a single point source using a single image frame. Note that the angular period ($p_g/2d$) is independent of the wavelength.

The two-axis interferometric tracking device, described in more detail below, may be constructed by combining two pairs of gratings, with each pair providing a shear along one axis (one pair along X and the pair other along Y), with three Wollaston prisms as image dividers. Each Wollaston prism separates incoming light into two orthogonal linearly polarized beams of different directions. In this manner, beams from a single light source are imaged onto two spots. Three Wollaston prisms may be placed in an optical cascade arrangement. In such an arrangement, one of the Wollaston prisms serves as an incident image divider for the optical cascade, and one of the prisms serves as an exit image divider for the optical cascade, so that eight ($=2^3$) spots are formed per light source following the exit prisms. One of the gratings is optically coupled between each optically adjacent image divider. For purposes of this description, two image dividers are optically adjacent if the pair are optically coupled and there are no other image dividers optically coupled between the pair. For example, with reference to FIG. 1A, prism 120 and prism 140 are optically coupled, but prism 120 and 160 are not.

The cascade arrangement may include additional image dividers, such that beams emerging from one image divider are directed into separate image dividers. Polarizing beam splitters may be substituted for Wollaston prisms in certain designs. Wollaston prisms and polarizing beam splitters both act as image dividers.

The first Wollaston in front of the two interferometric tracking devices is the incident image divider and is used to separate the two polarizations of the light arriving from a light source such as a star or a satellite. This is important because the two polarizations are statistically uncorrelated and will not interfere. Once the two polarizations are separated in angle by the first Wollaston prism, the two grating pair interferometers can be used to interfere beams of the same polarization. The first Wollaston prism is also used to deflect the two beams by an amount that will shift the X and Y phases by approximately ¼ cycle. This will allow the sinusoidal interference patterns to be sampled not just at 0 and 180 degree interference (constructive and destructive interference), but also in phase positions in between to allow greater phase estimation accuracy as is well known in the state of the art. The second and third Wollaston prisms are used to separate out constructive and destructive phase signals from each light source.

As explained above, the two axis interferometric tracking device contains two pairs of gratings. Ronchi phase gratings are generally not a suitable type of grating due to their low light throughput. Instead, the following types of gratings are preferred:
1. Birefringent gratings constructed by filling the grooves of a blazed grating with liquid crystal and covering the filled blazed grating with a cover glass,
2. Liquid crystal polarization gratings (LCPG), which have been successfully manufactured by several companies using manufacturing processes such as those outlined in U.S. Pat. No. 8,358,400, and
3. Blazed gratings made of birefringent material, e.g., sapphire.

An FPA optically coupled to the arrangement of three Wollaston prisms and two grating pairs registers eight spots, each of which is an image of the single light source, so that the phase of the sinusoidally modulated intensities can be measured.

A one-axis interferometric tracking device would result if one removed one of the grating pairs and the corresponding Wollaston prism (or beam splitter) from the two axis tracking device with three Wollaston prisms (or beam splitters) and two pairs of gratings. In this case, four spots would be registered for each light source.

Turning in detail to the drawings, FIG. 1A illustrates a two axis interferometric tracking device 100 consisting of an aperture 110, three Wollaston prisms (120, 140, and 160), two pairs of gratings (130 and 150), an optical stop 170, imaging optics 180, a focal plane array 190, and a processor 198. This is a side view of the device. The aperture 110 may coincide with the surface of the first Wollaston prism 120. The optical stop 170 may be an optical artifact rather than an actual physical element. The preferred embodiment of each of the grating pairs (130 and 150) consists of two flat gratings that are substantially parallel to each other and in contact with a spacer frame that is preferentially made of the same material as the two grating substrates. One suitable material for the substrates is fused silica. The grating pair and spacing can be bonded such that it expands and contracts as a uniform homogeneous unit. This is desirable since beam shear induced by the grating pair is proportional to the distance between the gratings divided by the period of the grating, and using the same material for the gratings and the spacers will make the beam shear invariant to the soak temperature fluctuations. A typical value for the grating period is 20 micrometers, and a typical value for the grating spacing is 2 cm. Each of the grating pairs (130 and 150) can be constructed using liquid crystal polarization gratings (LCPG). LCPG have been successfully manufactured by several companies using manufacturing processes such as those outlined in U.S. Pat. No. 8,358,400.

Unlike conventional gratings, LCPG diffract circular polarized light as shown in FIG. 1B. A pair of LCPG (132 and 134) provides a lateral shearing of the incoming light 101 with left and right hand circular components. The two components are sheared by a distance 138 that is proportional to the distance between the two gratings (132, 134) divided by the period of the gratings. The two sheared components can be combined or interfered using a linear polarizer 136.

The LCPG pair (consisting of individual gratings 132 and 134) is shown disposed between two Wollaston prisms in FIG. 1C. This is a top view looking down. Wollaston prisms perform an image divider function. They separate randomly polarized or unpolarized light into two orthogonal linearly polarized beams. The two orthogonal polarizations are indicated with arrows. The direction is indicated with letters p and n, for positive and negative deflection. Wollaston prisms are readily available from multiple vendors, and they also can be custom built to specifications by many optical manufacturers. A suitable material for Wollaston prisms is optical grade synthetic crystal quartz. It may be desirable to coat the surfaces of Wollaston prisms to minimize reflections. The two Wollaston prisms and the LCPG pair in FIG. 1C separate the incoming light 101 into four beams 103, 105, 107, and 109. The beam labeled 103 has been diverted twice in the p direction, and therefore it is marked pp. The beam labeled 105 has been diverted first in the p and then in the n direction, and therefore it is marked pn. The beam labeled 107 has been diverted first in the n and then in the p direction, and therefore it is marked np. The beam labeled 109 has been diverted twice in the n direction, and therefore it is marked nn. Adding another LCPG pair and another Wollaston prism (as shown in the two axis interferometric tracking device 100 in FIG. 1A) would increase the number of beams to eight. Beams can be labeled to show the order of the directions in which they have been diverted as they pass through the three Wollaston prisms, i.e., as ppp, ppn, pnp, pnn, npp, npn, nnp, and nnn.

To remain consistent in the explanation, it is assumed with reference to FIG. 1A, that the first Wollaston prism 120 produces the diagonal splitting, the second Wollaston prism 140 produces horizontal splitting, and the third Wollaston prism 160 produces the vertical splitting of the incoming beams while the first grating pair 130 shears the incoming light in the horizontal direction and the second grating pair 150 shears the incoming light in the vertical direction. This ordering of vertical and horizontal splitting and shearing can be changed. Furthermore, the splitting direction for the first Wollaston prism may be diagonal or horizontal or vertical or another angle.

Again going back to FIG. 1A incoming light incident on the aperture 110 consists of beams that originate from three point sources. Beams from the first source are labeled as A and produce an image A' on the focal plane array 190. Beams from the second source are labeled B and produce an image B' on the focal plane array 190. Beams from the third source are labeled as C and produce an image C' on the focal plane array 190. The beams that originate from the same source are substantially parallel to one another due to the distance between the source and the aperture 110. Each image A', B', C' consists of eight spots because the optical components disposed between the aperture 110 and the focal plane array 190 as explained in text and schematically with FIG. 1B and FIG. 1C. The refractive elements of the imaging optics 180 collectively bring the rays to a focus on the focal plane array 190.

The focal plane array 190 is preferably a two dimensional array of picture elements (pixels) each of which contains a detector that is sensitive to light in a specific spectral band. Most common FPAs that are widely available operate in the visible band, such as CCD and CMOS FPAs. Depending on the application, it may be preferable to use FPAs that register near infrared (NIR), short wave infrared (SWIR), midwave infrared (MWIR), or long waveinfrared (LWIR) light.

The focal plane array 190 is electrically linked to a processor 198 which receives, stores and processes the image frames captured by the focal plane array 190. The manner of processing the image frames is described in greater detail below.

FIG. 1D and FIG. 1E illustrate two different grating pairs which can be used to construct the two axis interferometric tracking device 100. FIG. 1D illustrates a paw of blazed gratings made of birefringent material, e.g., sapphire. The direction of the crystal axis (labeled c) is indicated for each grating pair element. The polarization of the beam in-between is also shown. FIG. 1E illustrates a pair of birefringent gratings constructed by filling the grooves of a blazed grating with birefringent material. One option for birefringent material is liquid crystal which may be covered with glass. The direction of the birefringence crystal axis (labeled c) is indicated for each grating pair filling material. The polarization of the beam in-between is also shown.

Each image A', B', C' in FIG. 1A consists of eight spots. FIG. 2 illustrates the arrangement of the eight spots (200, 210, 220, 230, 240, 250, 260, 270). As explained earlier, all eight spots correspond to a single point source and can be labeled according to the direction in which they have been diverted by the Wollaston prisms (p or n) as explained in FIG. 1C. Thus, the eight spots are denoted as ppp, ppn, pnp, pnn, npp, non, nnp and nnn. Depending on the particular specifications and orientation of the optical components, the eight spots can be arranged in a variety of patterns. As the point source moves across the field of view, the intensity of each of the spots fluctuates between a minimum and maximum intensity value.

The center of the eight spots 290 (labeled with "+") is the actual estimated position of the image which can be used to calculate a coarse estimate of the axial direction of the incident light from the imaged point source. The coarse position estimating process may start with a detection of the spots using thresholding or correlating or convolution or other suitable image or signal processing process.

A finer estimate is obtained by further processing the registered intensities of the eight spots, which includes pairwise summing of intensities to obtain approximately quadrature signals for X and Y axis position calculations. This summing takes advantage of the sum of two Wollaston spots being constant even while the division of intensity between the two spots may vary. For the horizontal axis (X) from grating pair 130, the four quadrature signals are obtained by summing the following pairs: ppn+ppp (260+270), pnn+pnp (220+230), npn+npp (240+250), and nnn+nnp (200+210). For the vertical axis (Y) from the grating pair 150, the four quadrature signals are obtained by summing the following pairs: ppn+pnn (260+220), ppp+pnp (270+230), nnp+npp (210+250) and nnn+npn (200+240).

The process of converting such a quadrature signal into a phase estimate is well understood by those skilled in the art. Accurate phase estimation depends upon knowing the exact X and Y phase shifts between the various signals, as well as the signal intensity and modulation level. All these parameters (relative phase, intensity and modulation level) vary for each spot as the point source moves across the field of view. To improve performance, these parameters can be measured after construction of the interferometric tracking device during a calibration procedure. The measurements can be compiled in a look-up table which can be referenced during track angle calculation. Similarly the relationship between signal phase and pixel location can also be calibrated so that the spot centroid can be used to determine the integer number of cycles to go along with the signal phase. The integer plus fraction phase is then calibrated to provide the absolute point source direction.

After calibration, the resulting phase estimate has been found to be substantially linear with angle of incidence (and hence the axial direction) of incoming light over a wide field of view and can be interpolated to better than a small fraction (e.g., $1/1000^{th}$) of a cycle. Thus, the phase estimate is easily converted into a fine determination of the relative position of the point source with respect to the boresight of the tracking device or with respect to other points on the FPA or with respect to other point sources imaged on the FPA.

As the tracking device 100 illustrated in FIG. 1A is designed, the optical components can be specified such that the phase goes through one cycle per pixel on the FPA 190 and through approximately 500-2000 cycles across the full field of view of the two axis interferometric tracking device 100. The number of phase cycles per pixel and the number of cycles across the entire field of view are a matter of design, and can be changed to suit the needs of the deployment environment.

The two axis interferometric tracking device 100 illustrated in FIG. 1A can be built using parts that are inherently, or have been shown to be through testing or use, radiation hardened or capable of operating in environments having a wide thermal range, e.g., between −65° C. to +65° C., or both. In addition, the two axis interferometric tracking device 100 can be constructed such that can accommodate operating at slew rates, e.g., 2 deg/sec. Depending upon the design particulars of the tracking device, the field of view, slew rate, accuracy, and radiation exposure capabilities may be different, larger or smaller. For example, spacing between the two gratings of a grating pair is related to the accuracy of the two axis interferometric tracking device and the slew rate it can accommodate for sustained accuracy during platform maneuvers or target motion. Smaller spacing between the two gratings of a grating pair results in less accuracy and higher slew rate tolerance.

The type of grating substrate used can limit the radiation exposure capabilities, as the type of FPA 190 and materials used for the imaging optics 180 and Wollaston prisms (120, 140, and 160). Typical radiation hard optical materials include fused silica and sapphire.

The two axis interferometric tracking device 100 illustrated in FIG. 1A is capable of tracking any desired number of point sources within its field of view. The multiple point sources may correspond to a star field, consisting of multiple stars, or a number of spacecraft, or a number of objects of interest.

The two axis interferometric tracking device 100 illustrated in FIG. 1A includes a processor 198, which may be integrated with the FPA 190, or alternately, the processor 198 may be an external processor which electronically communicates with the FPA 190. In either case the processor may be configured to receive electronic signals output from the FPA 190 and to estimate a relative coarse position of the light source from centroids of the eight spots on the FPA and to estimate a relative fine angular position of the light source from relative intensities of the eight spots on the FPA. Fine angular position estimates for a two-axis interferometric tracking device where the two axes are configured to be perpendicular (i.e., a horizontal (X) axis and a vertical (Y) axis) will result in a fine angular position estimate along the X-axis and a fine angular position estimate along the Y-axis.

The relative coarse position and the relative fine position, respectively, are determined from an estimated a coarse angle of incidence and a fine angle of incidence for each individual point source within the field of view of the tracking device 100. The angle of incidence, once obtained, is then used to determine the position of the point source within the field of view of the interferometric tracking device 100, and thereby the relative position of the point source to the tracking device 100, the platform, the boresight of the tracking device 100, or relative to other points on the FPA 190 or other point sources imaged on the FPA 190. The coarse angle of incidence is determined by estimating the centroid of the eight spots generated by a point source on the FPA 190. If the FPA 190 contained 512×512 pixels, the centroid position can be smaller than a single pixel area on the FPA, meaning that the position of the centroid within the pixel can be determined to within limited amount of accuracy from the position of the eight spots on the FPA. However, since the pairwise summation of the eight spots results in four quadrature signals each for horizontal and vertical position, which in turn provide a fine determination of the angle of incidence, no blurring of the image is necessary to increase accuracy.

There are several alternate design options for a two axis interferometric tracking device. An alternate embodiment 300 of the two axis interferometric tracking device is partially illustrated in FIG. 3. Note that the imaging optics and FPAs have been omitted in FIG. 3 to avoid cluttering of the illustration. In this alternate embodiment 300, the Wollaston prisms are replaced by polarizing beam splitters which like Wollaston prisms perform an image divider function. The rays 301 from a point source travel through beam splitter 320 and diverge onto two paths, one of which passes through grating pair 330 while the other passes through grating pair 332. Each ray of the two ray bundles is further split into two by the beam splitters 340 and 342.

On the one side (that of the beam splitter 340), one ray bundle that emerges from the beam splitter 340 travels through grating pair 350 and the other ray bundle that emerges from beam splitter 340 travels through grating pair 352. Each ray bundle is further split into two by beam splitters 360 and 362. Two ray bundles (301a and 301b) emerge from two surfaces of the beam splitter 360 and two ray bundles (301c and 301d) emerge from two surfaces of the beam splitter 362, as illustrated.

On the one side (that of the beam splitter 342), one ray bundle that emerges from the beam splitter 342 travels through grating pair 354 and the other ray bundle that emerges from beam splitter 342 travels through grating pair 356. Each ray bundle is further split into two by beam splitters 364 and 366. Two ray bundles (301e and 301f) emerge from two surfaces of the beam splitter 364 and two ray bundles (301g and 301h) emerge from two surfaces of the beam splitter 366, as illustrated.

The beam splitters 320, 340, 342, 360, 362, 364 and 366, much like the Wollaston prisms (120, 140 and 160) in FIG. 1A, separate randomly polarized or unpolarized light into two orthogonal linearly polarized beams. At the same time, the grating pairs 330, 332, 350, 352, 354 and 356 shear the incident beams, the same way that the grating pairs (130 and 150) in FIG. 1A do. Consequently, the optical elements shown in FIG. 3 are roughly equivalent to the optical components to the left of the optical stop 170 in FIG. 1A. What is different is that each of the eight spots that are imaged to the FPA 190 in FIG. 1A can be imaged onto eight separate FPAs by focusing each of the ray bundles 301a, 301b, 301c, 301d, 301e, 301f, 301g, and 301h through eight sets of imaging optics.

FIG. 4 illustrates part of the alternate embodiment 300 of the two axis interferometric tracking device, with imaging optics and FPAs. Only four imaging optics and FPAs are shown. The remaining four imaging optics and FPAs, as well as three additional beam splitters and two pairs of gratings, have been omitted from FIG. 4 to avoid cluttering the illustration. The rays 301 from a point source travel through beam splitter 320 at which point they split onto two paths, one of which passes through grating pair 330 and the other through grating pair 332. Following the path through grating pair 330, the rays that travel through the grating pair 330 are then split again by the beam splitter 340. One ray bundle travels through the grating pair 350 and the other ray bundle travels through the grating pair 352. The ray bundle that travels through grating pair 350 is again split into two ray bundles (301a and 301b) by the beam splitter 360. The two ray bundles (301a and 301b) emerge from two surfaces of the beam splitter 360. The ray bundle 301a is focused by the imaging optic 382 onto FPA 392. The ray bundle 301b is focused by the imaging optic 384 onto FPA 394. The ray bundle that travels through grating pair 352 is again split into two ray bundles (301c and 301d) which emerge from two surfaces of the beam splitter 362. The ray bundle 301c is focused by the imaging optic 386 onto FPA 396. The ray bundle 301d is focused by the imaging optic 388 onto FPA 398.

Each of the FPAs 392, 394, 396, and 398 contain only one single spot of the complete image of the point source that produces the incident rays 301. The complete image (comprising eight spots) of the point source is thus distributed between the eight FPAs (only four of which are shown in FIG. 4). The spot registered on each of the FPAs 392, 394, 396, and 398 correspond to the ray bundles 301a, 301b, 301c, and 301d, respectively. Likewise, an imaging optic and an FPA can be coupled to each of the surfaces of the beam splitters 364 and 366 (shown in FIG. 3) out of which ray bundles 301e, 301f, 301g, and 301h emerge, producing four more spots. Together with the four spots on FPAs 392, 394, 396, and 398, the total number of spots will be eight.

The eight spots on the eight separate FPAs are equivalent to the eight spots on one FPA which are shown in FIG. 2.

The alternate embodiment 300 of the two axis interferometric tracking device contains more parts and therefore is likely to be more costly and heavier than the two axis interferometric tracking device 100 in FIG. 1A. However, the alternate embodiment 300 offers several advantages over the two axis interferometric tracking device 100. One advantage is that two point sources that are too close to be distinguished using the two axis interferometric tracking device 100 because their multiple spots overlap on the single FPA 190 may become distinguishable using the alternate embodiment 300 since each FPA contains only one image of each point source. Another advantage is increased signal to noise ratio, especially in cases where the background intensity level is high compared to the point source intensity, for example when one is trying to register and track stars or spacecraft from the ground or from an airborne platform during daytime. The alternate embodiment 300 divides the background illumination into eight FPAs whereas the two axis interferometric tracking device 100 captures the background in a single FPA 190.

Other alternate embodiments can be constructed with two or four FPAs. Since the point source of interest signal is substantially constant and the background intensity is proportional to the number of spots, the signal to noise ratio will be inversely proportional to the square root of the number of spots. A single camera design has 8 spots of sky background, while a two camera design can be configured with four spots, a four camera with two spots and an eight camera design with a single spot of the background. This means that the background noise decreases as $1/(\text{number of cameras})^{0.5}$.

Inversely, the interferometric tracking device signal to noise ratio (dominated in many applications by the background) improves as (number of cameras)0.5.

Figure 5A:
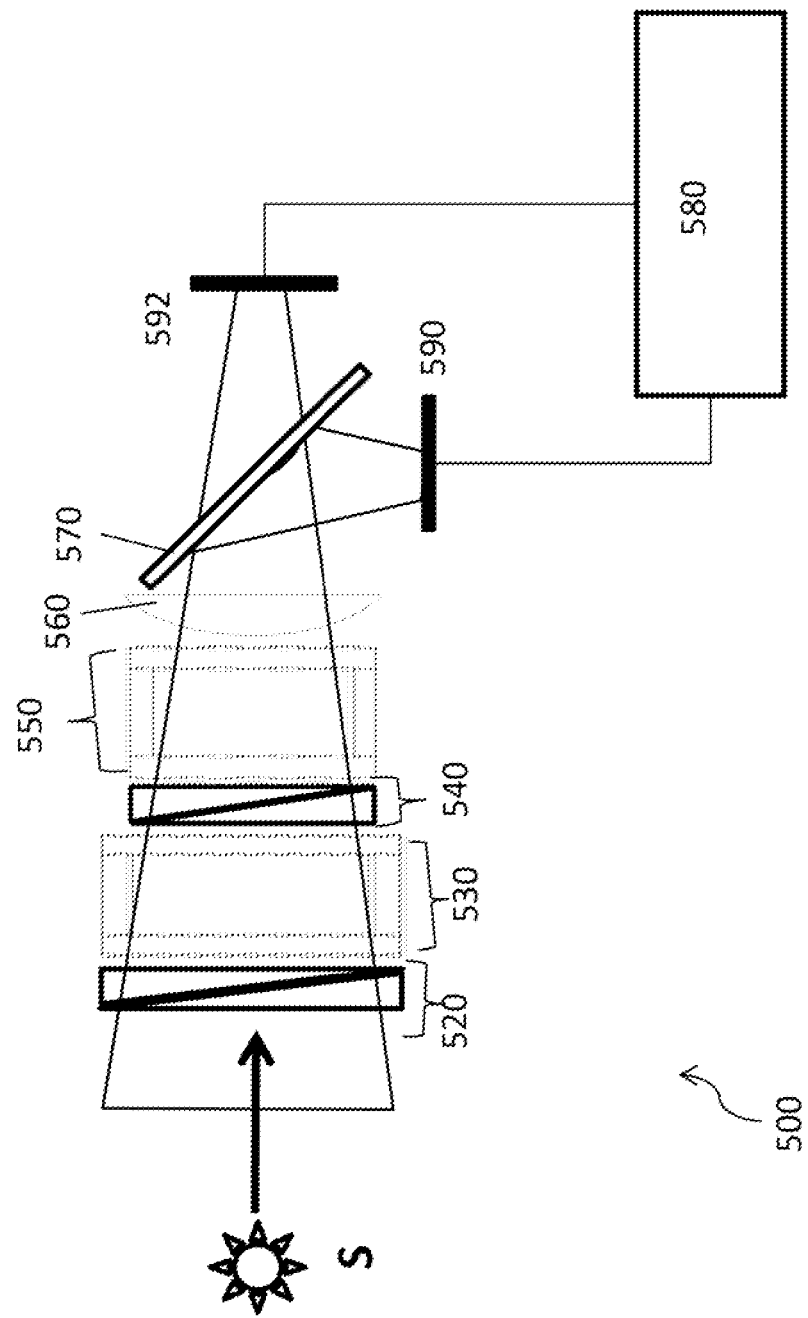
FIG. 5A is a schematic illustration of a two axis interferometric tracking device with two focal plane arrays.

An alternate embodiment 500 of the two axis interferometric tracking device with two FPAs is illustrated in FIG. 5A. The device is suitable for detecting and tracking dim objects against various background levels, for example, for detecting space objects from the ground against the daytime or night sky. The tracking device consists of two focal plane arrays (FPAs labeled 590 and 592) each electrically linked to a processor 580 which receives, stores and processes their output image frames, a polarizing beam splitter 570, a lens 560, two interferometers (550, 530), and two Wollaston prisms (520, 540). Each interferometer comprises a pair of gratings in substantial angular alignment separated by a spacer. The Wollaston prisms (520, 540) can be built into the surfaces of the gratings in the two interferometers (530, 550) they precede, respectively.

Both FPAs (590 and 592) are electrically linked to a processor 580 which receives, stores and processes their output image frames. The FPAs are preferably configured to image objects in the short wave IR band (e.g., using InGaAs FPAs) when viewing space objects against a bright sky background, e.g. during daytime. One preferred spectral range is between 1.4-1.7 microns. Another preferred spectral range is between 2.0-2.5 microns. Spectral band of light may be limited by inserting spectral filters inside the tracking device 500 or by selecting FPAs that are sensitive to the desired spectral band.

When collimated light from a distant light source S is incident on the first Wollaston prism 520 of the device 500, it is imaged on both FPAs (590, 592). The first image S1 on the first FPA 590 consists of four spots. Similarly, the second image S2 on the second FPA 592 also consists of four spots. Both sets of four spots are illustrated in FIG. 5B. The eight spots imaged onto the two FPAs (590, 592) can be labeled according to the direction in which they have been diverted by the Wollaston prisms 520 and 540 and by the polarizing beam splitter 570. Following this convention, the spots have been denoted as ppp, ppn, pnp, pnn, npp, npn, nnp and nnn. Depending on the particular specifications and orientation of the optical components, these spots can be arranged in a variety of patterns. As the point source moves across the field of view, the intensity of each of the spots fluctuates between a minimum and maximum intensity value.

The coarse position estimating for the light source process may start with a detection of the spots using thresholding or correlating or convolution or other suitable image or signal processing method. If all eight spots were on a single FPA, one could use the centroid of the eight spots to calculate a coarse position estimate. However since the eight spots are distributed across two FPAs 590 and 592, one has to first determine the optical alignment between the FPAs. This process may also involve a calibration step where a light source whose position is known very accurately may be used. Once the FPA's are aligned, the eight spots can be combined on a virtual single FPA plane. In FIG. 5B the center of the eight spots (labeled with "+" inside a circle) is the actual estimated centroid of the eight spots after such alignment. Therefore, the position marked with also corresponds to the coarse estimate of the axial direction of the incident light from the imaged point source.

A finer estimate is obtained by further processing the registered intensities of the eight spots, which includes pairwise summing of intensities to obtain approximately quadrature signals for position calculations along the two axes. The pairwise sums constitute the quadrature signals. For the first axis, the four quadrature signals are obtained by summing the following pairs: ppn+ppp, pnn+pnp, npn+npp, and nnn+nnp. For the second axis (generally perpendicular to the first axis), the four quadrature signals are obtained by summing the following pairs: ppn+pnn, ppp+pnp, nnp+npp and nnn+npn.

The processor 580 converts the four quadrature signals into a phase estimate using methods well known to those skilled in the art. Accurate phase estimation depends upon knowing the exact per axis phase shifts between the various signals, as well as the signal intensity and modulation level. All these parameters (relative phase, intensity and modulation level) vary for each spot as the point source moves across the field of view. To improve performance, these parameters can be measured after construction of the interferometric tracking device during a calibration procedure. The measurements can be compiled in a look-up table which can be referenced during track angle calculation. Similarly the relationship between signal phase and pixel location can also be calibrated so that the spot centroid can be used to determine the integer number of cycles to go along with the signal phase. The integer plus fraction phase is then calibrated to provide the absolute point source direction.

An alternate embodiment 600 of the two axis interferometric tracking device with four FPAs is illustrated in FIG. 6A. The device is suitable for detecting and tracking dim objects against various background levels, for example, for detecting space objects from the ground against the daytime or night sky. Using more FPAs increases the signal to background ratio per FPA since the background light gets distributed between multiple FPAs.

The tracking device 600 consists of four FPAs labeled 690, 692, 694 and 696) all electrically linked to a processor 680 which receives, stores and processes their output image frames, three polarizing beam splitters (640, 670, 672), two lenses (660, 664), three interferometers (630, 650, 654), and a Wollaston prism 620. The Wollaston prism 620 can also be built into the surfaces of the gratings in the interferometer 630 that follows it. The FPAs are preferably configured to image light in the short wave IR band (e.g., using InGaAs FPAs) when viewing space objects against a bright sky background, e.g., during daytime.

Figure 6B:
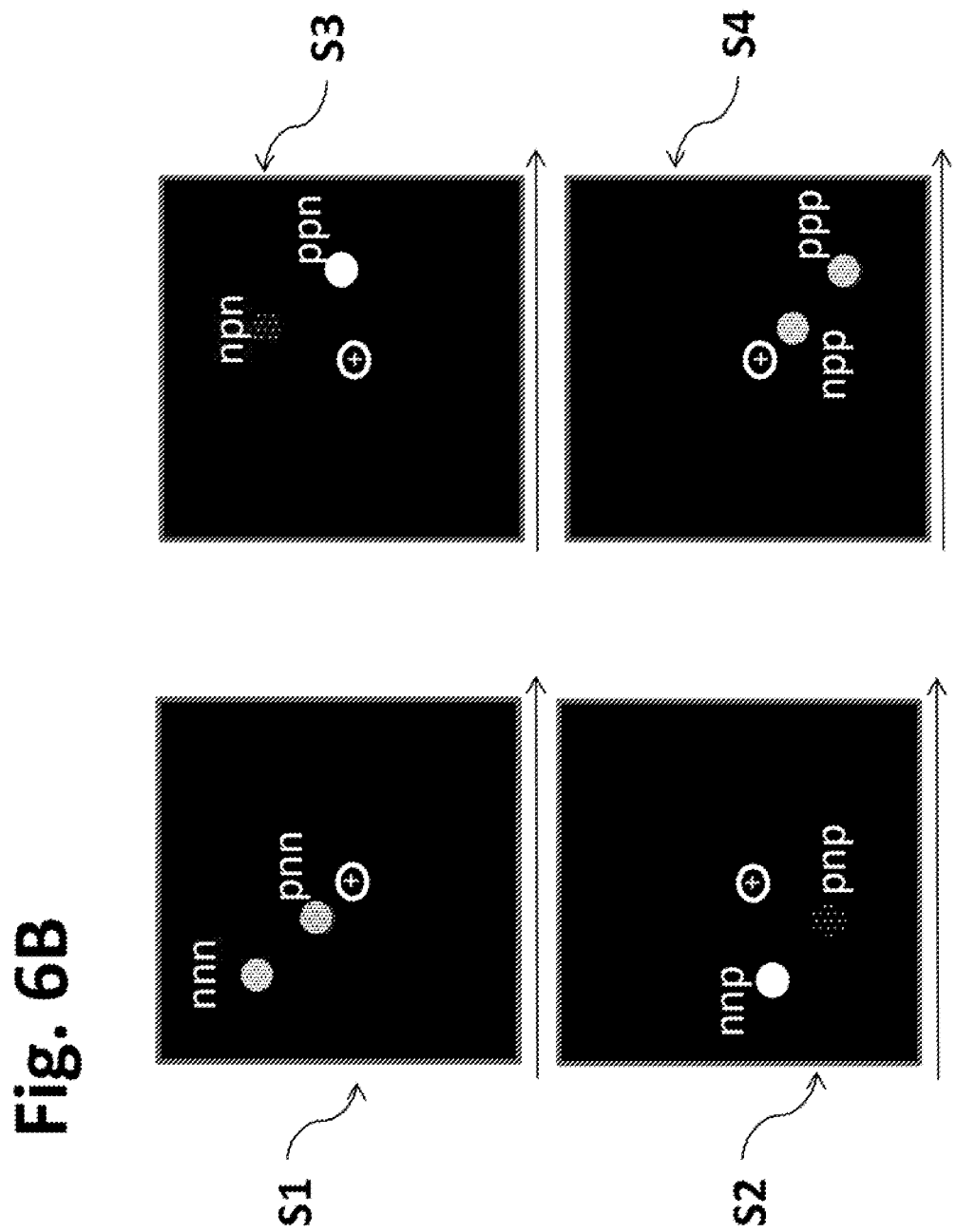
FIG. 6B shows the arrangement of eight spots corresponding to a single distant light source on the four FPAs of FIG. 6A.

When collimated light from a distant light source S is incident on the Wollaston prism 620 of the device 600, it is imaged on all four FPAs (690, 692, 694, and 696). FIG. 6B illustrates the arrangement of spots per FPA. The first image S1 is the arrangement expected on the first FPA 690. It consists of two spots. Similarly, the second image S2 is the arrangement expected on the second FPA 692; it also consists of two spots. Similarly, the third image S3 is the arrangement expected on the third FPA 694; it also consists of two spots. Similarly, the fourth image S4 is the arrangement expected on the fourth FPA 696; it also consists of two spots. The image frames are received, stored and processed by the processor 680.

These eight spots can be labeled according to the direction in which they have been diverted by the Wollaston prism 620 and the three polarizing beam splitters 640, 670 and 674. Following this convention, the spots have been denoted as ppp, ppn, pnp, pnn, npp, npn, nnp and nnn. Depending on the particular specifications and orientation of the optical components, these spots can be arranged in a variety of patterns. As the point source moves across the field of view, the intensity of each of the spots fluctuates between a minimum and maximum intensity value.

The coarse position estimating for the light source process may start with a detection of the spots using thresholding or correlating or convolution or other suitable image or signal processing method. If all eight spots were on a single FPA, one could use the centroid of the eight spots to calculate a coarse position estimate. However since the eight spots are distributed across four FPAs 690, 692, 694 and 696, one has to first determine the optical alignment between the FPAs. This process may also involve a calibration step where a light source whose position is known very accurately may be used. Once the FPA's are aligned, the eight spots can be combined on a virtual single FPA plane. In FIG. 6B the center of the eight spots (labeled with "+" inside a circle) is the actual estimated centroid of the eight spots after such alignment. Therefore, the position marked with "+" also corresponds to the coarse estimate of the axial direction of the incident light from the imaged point source.

A finer estimate is obtained by further processing the registered intensities of the eight spots, which includes pairwise summing of intensities to obtain approximately quadrature signals for position calculations per axis. The pairwise sums constitute the quadrature signals. For the first axis, the four quadrature signals are obtained by summing the following pairs: ppn+ppp, pnn+pnp, npn+npp, and nnn+nnp. For the second axis (generally orthogonal to the first axis), the four quadrature signals are obtained by summing the following pairs: ppn+pnn, ppp+pnp, nnp+npp and nnn+npn.

The processor 680 converts the four quadrature signals into a phase estimate using methods well known to those skilled in the art. Accurate phase estimation depends upon knowing the exact per axis phase shifts between the various signals, as well as the signal intensity and modulation level. All these parameters (relative phase, intensity and modulation level) vary for each spot as the point source moves across the field of view. To improve performance, these parameters can be measured after construction of the interferometric tracking device during a calibration procedure. The measurements can be compiled in a look-up table which can be referenced during track angle calculation. Similarly the relationship between signal phase and pixel location can also be calibrated so that the spot centroid can be used to determine the integer number of cycles to go along with the signal phase. The integer plus fraction phase is then calibrated to provide the absolute point source direction.

The two axis interferometric tracking devices 100, 300, 500 and 600 (illustrated in FIG. 1A, FIG. 3, FIG. 5A and FIG. 6A, respectively) are capable of tracking multiple distant light sources within their field of view. The multiple point sources may correspond to stars in a star field, or a number of spacecraft, or a number of objects of interest, or a combination thereof.

Sensitivity of the interferometric tracking devices 100, 300, 500 and 600 are generally a function of their input aperture area and field of view. In general terms larger apertures allow more light in whereas smaller fields of view limit the background light. Hence optically coupling an interferometric device to a telescope with a large input aperture and limited field of view is often desirable. This can be accomplished by routing the light captured by the telescope to be incident upon the first optical element of the tracking device (i.e., 110 or 120 in FIG. 1A, 320 in FIG. 3, 520 in FIG. 5A, and 620 in FIG. 6A).

The two axis interferometric tracking device 300 (illustrated in FIG. 3) may further be communicably coupled with one or more external processors electronically linked to its FPAs. Alternately, the interferometric tracking device 300 may further include an internal processor interfaced to its FPAs as is the case with embodiments 100, 500, and 600. In either case the processor or processors may be configured to receive electrical and electronic signals output from the FPAs and use those signals to determine a coarse angle of incidence and a fine angle of incidence for each individual point source within the field of view of the tracking device as explained earlier. The angle of incidence, once obtained, is used to determine the position of the point source within the field of view of the interferometric tracking device, and thereby the relative position of the point source to the tracking device, the platform, the boresight of the tracking device, or relative to other points on the one or more FPAs or other point sources imaged by the tracking device. As explained, the coarse angle of incidence is determined by estimating the centroid of the eight spots generated by a point source. A finer estimate can be obtained by pairwise summation of the eight spots results resulting in four quadrature signals for each axis.

When an object moves across the field of view it generates a sinusoidally flashing signature with a temporal frequency proportional to its slew rate across the one or more FPAs. The motion of light sources across the one or more FPAs is a combination of the motion of the light sources with respect to the background and the motion of the tracking device. Multiple objects will generate multiple such tracks. If the source is bright enough against the background, it can be detected in each image frame as oscillatory signals. In many cases, however, these signals will be so dim that the oscillatory signals will not be distinguishable from the background level or from noise without further processing. A frequency domain processing method is preferred for these cases. This method is illustrated in FIG. 7 and explained below.

There are many possible positions and directions for targets, and looking blindly (i.e. in the absence of any information about the location, speed and heading of one or more light sources), each possible trajectory must be checked. Since in practice the signal to background or signal to noise ratios can be very low in each pixel, a full path match is needed for low false alarm rate and high probability of detection. The result is a significant computational load even though most of the computations can be performed in parallel. If this search is performed for each FPA of a multi-FPA tracking device, the load will even be heavier. One potential way to reduce the load with a multi-FPA tracking device is to combine image frames from multiple FPAs taken at the same time instance into a single virtual image frame and perform a search on only that single virtual frame sequence. Another possible source for reducing the computation load of a search is pixel binning, where regions on the FPA are treated as a single pixel during the search. Full resolution can be restored once the approximate path of a light source is detected.

It is usually necessary to process thousands of frames to provide sufficient sampling of the quadrature sine wave signals associated with tracking. At a typical frame rate of 25 frames per second (fps 1000 frames will take 40 seconds. During that time the light source may move thousands of pixels (getting outside the field of view) or only a few pixels on the FPA depending on the velocity of the object relative to the tracking device.

FIG. 7 illustrates a preferred processing method for detecting and tracking dim objects using the data from a multiple FPA tracking device. First, in step 704 the FPAs are synchronized so they capture image frames substantially simultaneously in step 710. (This synchronization step 704 can be omitted if only one FPA is used.) The simultaneous outputs of FPAs (imaging the same scene at the same time instant) can be processed separately or combined into a single virtual FPA image frame. In the specific method outline in FIG. 7, they are combined into virtual frames in step 720 and these virtual frames are stored on a disk 734 in step 730. Multiple virtual frames (e.g., one thousand frames) are retrieved from disk 734 in step 740 and mapped into possible trajectories in step 750. Note that the disk 734 need not be a separate storage device. A buffer or memory storage element inside a processor can be used, as well.

Mapping a trajectory involves concatenating the intensity values of the pixels or of the regions (e.g., the sum of pixel intensities in an 8×8 area) where an object following that trajectory would be found. For example, consider a trajectory corresponding to an object traversing the field of view diagonally traveling one pixel in each axis starting from image pixel location (1,1) at one corner of the image frame and ending at the opposite corner at pixel location (1000,1000). Mapping this trajectory involves concatenating pixel (1,1) in image frame 1 to pixel (2,2) in image frame 2 to pixel (3,3) in image frame 3 and so on, ending with pixel (1000,1000) in image frame 1000, resulting in 1000 data points. Multiple trajectories are mapped in this manner.

A Fast Fourier Transform (FFT) is performed on each trajectory in step 760. FFT is a transformation operation that is well known to those skilled in the art. FFT output expresses the series of intensities in the trajectory in terms of a sum of sinusoidal signals at different frequencies. If an object is actually following a given trajectory, the frequency or frequencies in the FFT output corresponding to that object's modulation rate as it moves along that path will stand out in the FFT output values. If the actual values of the FFT coefficient at that frequency or frequencies exceed a threshold, then a track is declared as shown in step 770. Generally a single frequency value is expected; however distortions can be observed because of changes in observed velocities across the FPAs. The threshold is chosen to keep the probability of a false alarm due noise below a desired value. At this point, further refinements can be made to velocity and location estimates of the object following that trajectory as shown in step 780. For example, if regions (instead of pixels) were processed, one can go back to the full resolution virtual FPA and process the now limited number of possible tracks in pixel or sub-pixel resolution. Another possibility is to store all FPA outputs (instead of storing only the virtual FPA image) and go back to processing multiple FPA images at increased resolution separately to obtain multiple estimates which can be combined to a refined estimate.

The method explained above may be used to detect and track multiple objects in the field of view. These objects may be traveling at different velocities. Moreover, the search for objects and/or their trajectories will be constrained in many practical applications. As an example, consider an interferometric tracking device positioned on the ground and tasked with observing stars and satellites against the daytime sky. Given the coordinates of the observation location, elevation and azimuth angles of the boresight of the tracking device, and the time of day, many of the star positions overhead will be known a priori. Given the known rotational velocity of the Earth, one can also limit the search for the trajectories these stars will take. Therefore, searching for them will require processing a significantly smaller number of trajectories than the number of unconstrained trajectories. At the same time, the trajectories corresponding to various types of orbits (geostationary, polar, etc.) can be mapped and processed in search of space objects. Since the space object observations will be accurately referenced to the star positions, their tracks can be referenced to both Earth Centered Inertial (ECI) and Earth Centered Earth Fixed (ECEF) coordinate systems.

Thus, an improved two axis interferometric tracking device and method of tracking the relative movement of a point source are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. An interferometric tracking device comprising:
   image dividers arranged to form an optical cascade in three splitting stages and to form a plurality of optically adjacent pairs, with one of the image dividers being an incident image divider for the optical cascade and one or more of the image dividers being one or more exit image dividers for the optical cascade, wherein each of the image dividers splits incident light into a plurality of non-parallel orthogonally polarized beams, and the beams from the incident image divider cascading through the other image dividers in the optical cascade;
   a plurality of shearing interferometers, one of the shearing interferometers being optically coupled between each optically adjacent pair of image dividers in the optical cascade;
   one or more focal plane arrays, the orthogonally polarized beams from the one or more exit image dividers being imaged onto the one or more focal plane arrays.

2. The device of claim 1, wherein the plurality of shearing interferometers includes a first shearing interferometer and a second shearing interferometer, each of the first and second shearing interferometer configured to shear incident light along a direction substantially orthogonal to a shearing direction of the other of the first and second shearing interferometer.

3. The device of claim 1, wherein the plurality of shearing interferometers includes a first shearing interferometer and a second shearing interferometer, the first shearing interferometer being configured to shear the incident light horizontally with respect to the at least one focal plane array, and the second shearing interferometer configured to shear the incident light vertically with respect to the at least one focal plane array.

4. The device of claim 1, wherein at least one of the image dividers comprises a Wollaston prism.

5. The device of claim 1, wherein at least one of the image dividers comprises a polarizing beam splitter.

6. The device of claim 1, further comprising an aperture configured to receive and direct light toward the first image divider.

7. The device of claim 1, further comprising a beam director configured to receive and steer light toward the first image divider.

8. The device of claim 1, wherein each shearing interferometer comprises
   a first grating; and
   a second grating optically coupled to the first grating.

9. The device of claim 8, wherein each of the first grating and the second grating comprises a birefringent grating.

10. The device of claim 9 wherein each of the birefringent gratings comprises a blazed grating having grooves filled with liquid crystal and a glass cover disposed on the filled grooves.

11. The device of claim 8, wherein each of the first grating and the second grating comprises a blazed grating made from a birefringent material.

12. The device of claim 8, wherein each of the first grating and the second grating comprise a liquid crystal polarization grating (LCPG).

13. The device of claim 8, wherein the first grating and the second grating are configured in combination to produce an interference pattern which minimizes a zero order peak for broad spectrum light in the visible band.

14. The device of claim 8, wherein the first grating and the second grating are configured in combination to produce an interference pattern which minimizes a zero order peak for broad spectrum light in the near infrared (NIR) band.

15. The device of claim 8, wherein the first grating and the second grating are configured in combination to produce an interference pattern which minimizes a zero order peak for broad spectrum light in the shortwave infrared (SWIR) band.

16. The device of claim 8, wherein the first grating and the second grating are configured in combination to produce an interference pattern which minimizes a zero order peak for broad spectrum light in the midwave infrared (MWIR) band.

17. The device of claim 8, further including a spacer between the first grating and the second grating, the first grating and the second grating being etched onto a first substrate and a second substrate, respectively.

18. The device of claim 17, wherein the first substrate, the second substrate, and the spacer are each formed from a first material.

19. The device of claim 1, further comprising at least one set of imaging optics configured to focus the orthogonally polarized beams from the one or more exit image dividers onto a spot on the one or more focal plane arrays.

20. The device of claim 1, further comprising a processor communicably coupled with the one or more focal plane arrays, the processor being configured to estimate a relative coarse position of a point source having light incident on the first image divider based on a center of a plurality of spots generated on the one or more focal plane arrays and to estimate a relative fine position of the point source based on relative intensities of the plurality of the spots on the one or more focal plane arrays.

21. A two axis interferometric tracking device comprising:
    image dividers arranged to form an optical cascade in three splitting stages and to form a plurality of optically adjacent pairs, with one of the image dividers being an incident image divider for the optical cascade and one or more of the image dividers being one or more exit image dividers for the optical cascade, wherein each of the image dividers splits incident light into a plurality of non-parallel orthogonally polarized beams, and the beams from the incident image divider cascading through the other image dividers in the optical cascade;
    a plurality of shearing interferometers, one of the shearing interferometers being optically coupled between each optically adjacent pair of image dividers in the cascade;
    one or more focal plane arrays, the orthogonally polarized beams from the one or more exit image dividers being imaged onto the one or more focal plane arrays;
    at least one set of imaging optics configured to focus the orthogonally polarized beams from the one or more exit image dividers onto a spot on the one or more focal plane arrays; and
    a processor communicably coupled with the one or more focal plane arrays, the processor being configured to estimate a relative coarse position of a point source having light incident on the first image divider based on a center of a plurality of spots generated on the one or more focal plane arrays and to estimate a relative fine position of the point source based on relative intensities of the plurality of the spots on the one or more focal plane arrays.

22. The device of claim 21, wherein the shearing interferometer comprises
    a first grating; and
    a second grating optically coupled to the first grating.

23. The device of claim 22, wherein the first grating and the second grating are configured in combination to produce an interference pattern which minimizes a zero order peak for broad spectrum white light.

24. The device of claim 22, further including a spacer between the first grating and the second grating, the first grating and the second grating being etched onto a first substrate and a second substrate, respectively.

25. The device of claim 24, wherein the first substrate, the second substrate, and the spacer are each formed from a first material.

26. The device of claim 21, wherein at least one of the image dividers comprises a Wollaston prism.

27. The device of claim 21, wherein at least one of the image dividers comprises a polarizing beam splitter.

28. The device of claim 21, wherein the plurality of spots includes 2N spots generated for each point source in a field of view of the first image divider, wherein N is an integer equal to a number of the image dividers encountered by a beam path traversing the optical cascade.

29. The device of claim 21, wherein each spot generated by each image divider does not overlap with other generated spots.

* * * * *